United States Patent [19]

Bredbenner, Jr.

[11] 4,071,663
[45] Jan. 31, 1978

[54] BATTERY FEEDTHROUGH PENETRATOR

[75] Inventor: Ambrose M. Bredbenner, Jr., Averill Park, N.Y.

[73] Assignee: Interpace Corporation, Parsippany, N.J.

[21] Appl. No.: 783,672

[22] Filed: Apr. 1, 1977

[51] Int. Cl.² .............................................. H01M 2/06
[52] U.S. Cl. .................................... 429/181; 429/185
[58] Field of Search ............... 429/181, 185, 184, 174, 429/178, 102, 103; 29/623.2

[56] References Cited

U.S. PATENT DOCUMENTS

| 3,840,408 | 10/1974 | Bondley | 429/181 |
| 4,006,282 | 2/1977 | Antoine | 429/181 |

Primary Examiner—Anthony Skapars
Attorney, Agent, or Firm—Charles E. Baxley

[57] ABSTRACT

In the housing of a battery there is a circular opening to which is fixed an outwardly extending cylindrical metal sleeve. A tubular ceramic insulator having high compressive strength and provided with an axial passageway as well as first and second tapered ends has one of those ends resting in the first cylindrical metal sleeve. A second cylindrical metal sleeve similar to the first rests on the other end of the tubular ceramic member. The second sleeve is provided with a cap through which passes an electrical conductor. The conductor extends through the passageway of the ceramic member into the battery housing. An axially compressive force rams the metal sleeves fixedly to the tubular ceramic insulator.

8 Claims, 3 Drawing Figures

BATTERY FEEDTHROUGH PENETRATOR

BACKGROUND OF THE INVENTION

This invention pertains to electrical feedthrough penetrators and more particularly to those penetrators used in batteries requiring a sealed chamber.

There presently is being developed high performance batteries for powering electrical vehicles and for storing off-peak electrical energy generated by electric utility power stations. A typical battery is of the lithium-iron sulfide type. The electrolytes used in such batteries are molten and require operating temperatures of from 400° to 500° C. A typical electrolyte is a molten salt mixture of lithium chloride-potassium chloride (LiCl-K Cl). Such electrolytes create extremely hostile environments within batteries, especially at positive electrodes. Heretofore most electrical feedthrough penetrators to the batteries employed brazes for bonding ceramic insulators to metal conductors and housings. These brazes are not resistant to cell environment. The most common modes of failure are chemical oxidation of the brazes upon charging, reaction of the braze with the sulfides and galvanic corrosion at the braze joint resulting from the electrochemical dissimilarity of the braze materials from its adjacent parts.

SUMMARY OF THE INVENTION

In general, the invention contemplates a battery having a housing provided with a circular opening so that an electrical feedthrough can be connected at the circular opening to the housing. The feedthrough penetrator has a first cylindrical metal sleeve extending outwardly from the housing of the battery and a tubular ceramic member of high compressive strength provided with an axial passageway and first and second tapered ends. The tubular ceramic member rests in the first cylindrical sleeve. A second cylindrical metal sleeve rests on the tubular ceramic member. The other end of the second cylindrical sleeve is provided with a cap through which passes a rod-like electrical conductor. The conductor extends from both sides of the cap and, in particular, the end extending into the sleeve also passes through the passageway of the ceramic member into the region encompassed by the first cylindrical sleeve. The sleeves are axially compressed so that the ceramic member forms a tight seal with each of the sleeves.

DESCRIPTION OF THE DRAWING

The objects, features and advantages of the invention will be apparent from the following detailed description when read with the accompanying drawing which shows the presently preferred embodiment of the invention.

In the drawing.

DESCRIPTION OF THE PREFERRED EMBODIMENT

Figure 1:
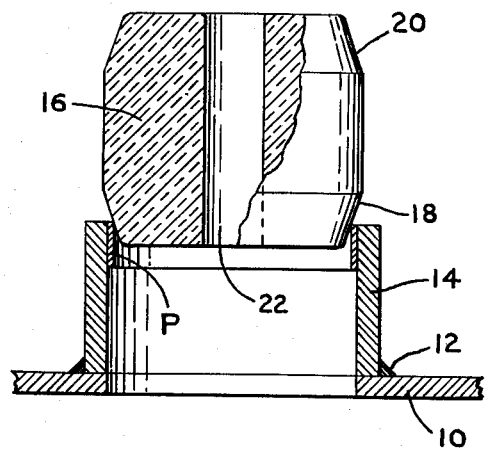
FIG. 1 is a sectional view of a tubular ceramic member resting in a cylindrical sleeve fixed to a battery housing in accordance with the preferred embodiment of the invention.

In FIG. 1, there is shown a portion of a battery housing 10 provided with an access opening. Welded at 12 about the peripheral edge of the opening in the housing is a first cylindrical sleeve 14 which is preferably made from the high tensile strength steel, preferably having long life and high strength up to 500° C. The inner wall of the free end of the sleeve 14 is plated with a layer P of malleable material. The malleable material can be silver, copper and the like (depending on the electrolyte) having a thickness in a range of from 0.002 to 0.0005 inches. (It has been found that an extremely desirable thickness is about 0.001 inches.) There is then placed in the free end of the sleeve 14 an insulator 16. The insulator 16 is a ceramic member of high compressive strength. As an insulating material it is preferred to use beryllium oxide. The insulator 16 is provided with an axial passageway 22 as well as the tapered ends 18 and 20. The taper of the end 18 is such that the outside diameter ranges from a magnitude less than the inside diameter of the sleeve 14 to a value which is greater than said inside diameter. Although a different taper could be used for end 20 it is preferable for the tapers to be the same.

Figure 2:
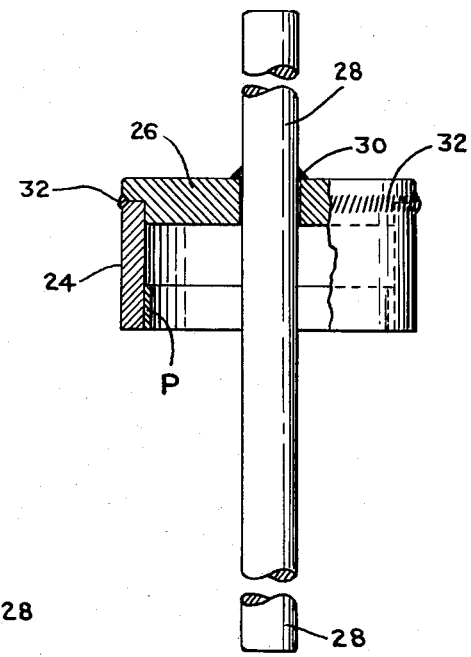
FIG. 2 shows a second cylindrical sleeve having a cap through which passes an electrical conductor in accordance with the invention.

In FIG. 2 there is shown the electrode assembly of the penetrator. In particular this electrode assembly also includes a sleeve 24 similar to sleeve 14 with its inner wall being provided at its one end with the similar layer P of malleable material. Welded to the other end of the sleeve 24 is a cap 26 provided with a central opening. The sleeve and the cap may be one piece. Passing through the central opening is a conductor 28. It is preferred to use molybdenum in conductor 28 which is brazed at 30 to be fixed sealingly to the cap 26. A protective layer of molybdenum preferably is deposited over the braze.

Figure 3:
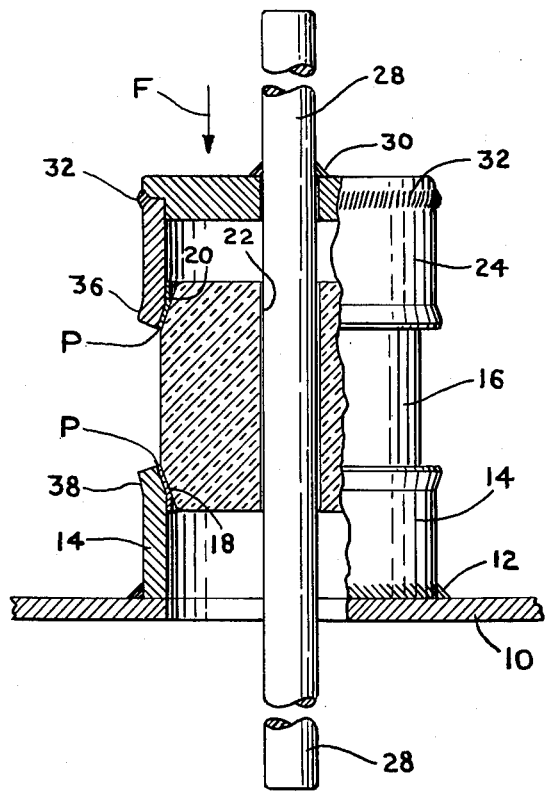
FIG. 3 shows the sleeves and ceramic member of FIGS. 1 and 2 assembled into an electrical feedthrough penetrator in accordance with the invention.

The electrode assembly of FIG. 2 then is fitted onto the free end 20 of insulator 16 with the conductor 28 passing through passageway 22. Then axial pressure is applied in the direction of arrow F in FIG. 3. Sufficient axial pressure is applied so that the ends 36 and 38 of the sleeves 24 and 14 respectively flare outwardly. In addition the material of the layer P is deformed and smeared over the tapered surfaces of the ends 18 and 20 of the insulator 16. This smearing effect provides the equivalent of a gasket to form a very efficient seal. In addition the flaring of the ends induces hoop stresses which tightly fix the sleeves to the insulator even after the ramming axial force is removed.

Although only one embodiment of the invention has been shown and described in detail, there will now be obvious to those skilled in the art many modifications and variations satisfying many or all of the objects, features and advantages of the invention but which do not depart from the theme thereof.

I claim:

1. In a battery having a housing provided with a circular opening, an electrical feedthrough penetrator comprising:

a first cylindrical metal sleeve outwardly extending from the housing of the battery and fixed to the peripheral edge of the housing surrounding the opening;

a tubular ceramic member of high compressive strength being provided with an axial passageway, said tubular ceramic member having a first end portion tapered from a first outside diameter which is less than the inside diameter of said first cylindrical metal sleeve to a second outside diameter which is greater than said inside diameter and a second end portion tapered from a third outside diameter to a fourth outside diameter, the tapered first end portion of said tubular ceramic member being compressively fitted in the end portion of said first cylindrical metal sleeve remote from the battery housing;

a second cylindrical metal sleeve having an inside diameter intermediate said third and fourth outside diameters, a metal cap fixed to and covering one end portion of said second cylindrical sleeve, said cap being provided with a central opening; and a rod-like conductor fixed to said cap and extending through the central opening thereof in both directions;

the other end portion of said second cylindrical sleeve being fitted to the second end portion of said tubular ceramic member with said rod-like conductor extending through the axial passageway of said tubular ceramic member into the region encompassed by said first cylindrical sleeve.

2. The penetrator of claim 1 wherein the inner wall in the region of the end portion of said first cylindrical sleeve remote from the battery housing and the other end portion of said second cylindrical sleeve have a layer of malleable material.

3. The penetrator of claim 2 wherein said sleeves are made of high tensile strength steel and said layer of malleable material is a plating of copper having a thickness of from 0.0005 to 0.002 inches.

4. The penetrator of claim 3 wherein said thickness is about 0.001 inches.

5. The penetrator of claim 1 wherein said tubular ceramic member is made from beryllium oxide.

6. The penetrator of claim 1 wherein said first and third outside diameters are equal and said second and fourth diameters are equal.

7. The penetrator of claim 1 wherein the material of said rod-like conductor includes molybdenum.

8. A method of providing a feedthrough penetrator for a battery having a housing with a circular opening comprising the steps: plating with a malleable metal the inner wall of one end portion of a first cylindrical metal sleeve having a given inside diameter, fixing the other end portion of said first cylindrical sleeve to the housing about the circular opening, providing a tubular element of ceramic material with high compressive strength, said tubular element having a central passageway and being tapered at each end portion from a first outside diameter which is less than said given inside diameter to a second outside diameter which is greater than said given inside diameter, resting one end portion of said tubular element in the said one end portion of said first cylindrical sleeve, plating with said malleable metal the inner wall of one end portion of a second cylindrical metal sleeve having said given inside diameter, fixing to the other end portion of said second cylindrical sleeve a cap being provided with a central opening, fixing to said cap a rod-like conductor which extends in both directions from said central opening, resting the other end portion of said second cylindrical sleeve onto the other end portion of said tubular element with the rod-like conductor passing through the central passageway thereof into the region surrounded by said first cylindrical sleeve, and axially ramming said cylindrical sleeves toward each other whereby the plating material on the inner walls of said sleeve is smeared over the abutting surface of said tubular element to provide a seal.

* * * * *